3,184,475
MALEIMIDES, MALEAMIDES AND FUMARAMIDES
Charles J. Eby, North Springfield, Va., and Erhard J. Prill, Des Peres, Mo., assignors to Monsanto Company, a corporation of Delaware
No Drawing. Filed Sept. 15, 1961, Ser. No. 138,256
8 Claims. (Cl. 260—326.5)

This invention relates to new and useful compounds, biological toxicant compositions, and the use of these new compounds to kill or inhibit the growth of microorganisms (bacteria and fungi) and to treat soil to kill or inhibit the growth of fungi therein.

The novel compounds of the invention are of the formulas

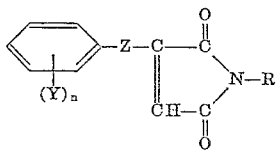

and

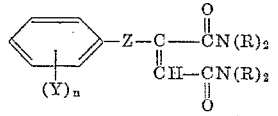

wherein Y is selected from the class consisting of halogen atoms, preferably chlorine atoms, and lower alkyl radicals, preferably methyl radicals; $n$ is 0 or an integer from 1–5, i.e., an integer from 0 to 5, inclusive; Z is S, SO, $SO_2$; and, R is a lower alkyl radical. The R's can be the same or different lower alkyl radicals or a mixture of lower alkyl radicals. A lower alkyl radical is an alkyl radical having from 1 to 6 carbon atoms, inclusive. The compounds of the above formula wherein R is a higher alkyl radical, i.e., a radical having from about 8 to 18 carbon atoms are also useful compounds some of them being useful as biological toxicants. The second formula above represents both maleamides and fumaramides, i.e., compounds made from both maleic and fumaric amides.

It is an object of this invention to provide new and useful compounds.

It is another object of this invention to provide new and useful biological toxicant compositions.

It is another object of this invention to provide a new method of killing or inhibiting the growth of microorganisms using the new compounds of the invention.

It is another object of this invention to provide a new method of treating soil to kill or inhibit the growth of fungi therein using the new compounds of the invention.

These and other objects of the invention will become apparent as the detailed description of the invention proceeds.

The following is an illustrative listing of the compounds of the invention:

N-methyl-3-(phenylthio)maleimide,
N-ethyl-3-(p-tolylthio)maleimide,
N-isopropyl-3-(o-tolylthio)maleimide,
N-n-butyl-3-(m-tolylthio)maleimide,
N-t-butyl-3-(2,4-xylylthio)maleimide,
N-isobutyl-3-(2,3,4-trimethylphenylthio)maleimide,
N-n-pentyl-3-(2,3,5,6-tetramethylphenylthio)maleimide,
N-n-hexyl-3-(pentamethylphenylthio)maleimide,
N-n-propyl-3-(o-ethylphenylthio)maleimide,
N-ethyl-3-(2-methyl-4-ethylphenylthio)maleimide,
N-isopropyl-3-(p-isobutylphenylthio)maleimide,
N-methyl-3-(o-t-butylphenylthio)maleimide,
N-n-propyl-3-(o-methyl-m-n-pentylphenylthio)maleimide,
N-ethyl-3-(p-n-hexylphenylthio)maleimide,
N-methyl-3-(p-chlorophenylthio)maleimide,
N-ethyl-3-(o-chlorophenylthio)maleimide,
N-isopropyl-3-(m-chlorophenylthio)maleimide,
N-methyl-3-(2,4-dichlorophenylthio)maleimide,
N-t-butyl-3-(3,4-dichlorophenylthio)maleimide,
N-methyl-3-(2,3,5-trichlorophenylthio)maleimide,
N-n-hexyl-3-(2,3,5,6-tetrachlorophenylthio)maleimide,
N-methyl-3-(pentachlorophenylthio)maleimide,
N-ethyl-3-(o-bromophenylthio)maleimide,
N-isopropyl-3-(o-iodophenylthio)maleimide,
N-isobutyl-3-(3,4-difluorophenylthio)maleimide,
N-methyl-3-(o-chloro-p-bromophenylthio)maleimide,
N-methyl-3-(p-chloro-o-tolylthio)maleimide,
N,N,N',N'-tetramethyl-alpha-(o-tolylthio)maleamide,
N-methyl-N-ethyl-N'-isopropyl-N'-t-butyl-alpha-(m-tolylthio)maleamide,
N,N-dimethyl-N',N'-diethyl-alpha-(p-tolylthio)maleamide,
N,N-di-n-pentyl-N',N'-diethyl-alpha-(2,4-xylylthio)maleamide,
N,N-di-n-butyl-N',N'-di-n-hexyl-alpha-(2,3,4-trimethylphenylthio)maleamide,
N,N-dimethyl-N',N'-diethyl-alpha-(3,4,5,6-tetramethylphenylthio)maleamide,
N,N,N',N'-tetraethyl-alpha-(pentamethylphenylthio)maleamide,
N,N,N',N'-tetraisopropyl-alpha-(o-isobutylphenylthio)maleamide,
N,N-di-n-butyl-N',N'-di-n-hexyl-alpha-(o-methyl-p-n-hexylphenylthio)maleamide,
N,N,N',N'-tetraethyl-alpha-(o-chlorophenylthio)maleamide,
N,N,N',N'-tetramethyl-alpha-(p-chlorophenylthio)maleamide,
N,N-dimethyl-N',N'-diethyl-alpha-(m-chlorophenylthio)maleamide,
N,N,N',N'-tetraisopropyl-alpha-(3,4-dichlorophenylthio)maleamide,
N,N-dimethyl-N',N'-diisopropyl-alpha-(3,4,5-trichlorophenylthio)maleamide,
N,N,N',N'-tetramethyl-alpha-(2,3,5,6-tetrachlorophenylthio)maleamide,
N,N-dimethyl-N',N'-diethyl-alpha-(pentachlorophenylthio)maleamide,
N,N-dimethyl-N',N'-diisobutyl-alpha-(p-bromophenylthio)maleamide,
N,N,N',N'-tetramethyl-alpha-(o-chloro-p-fluorophenylthio)maleamide,
N,N-dimethyl-N',N'-diethyl-alpha-(o-iodophenylthio)maleamide,
N,N-dimethyl-N',N'-diisopropyl-alpha-(3,4-difluorophenylthio)maleamide,
N,N,N',N'-tetramethyl-alpha-(o-tolylthio)fumaramide,
N-methyl-N-ethyl-N'-isopropyl-N'-t-butyl-alpha-(m-tolylthio)fumaramide,
N,N-dimethyl-N',N'-diethyl-alpha-(p-tolylthio)fumaramide, N,N-di-n-pentyl-N',N'-diethyl-alpha-(2,4-xylyl-
    thio)fumaramide,
N,N-di-n-butyl-N',N'-di-n-hexyl-alpha-(2,3,4-tri-
    methylphenylthio)fumaramide,
N,N-dimethyl-N',N'-diethyl-alpha-(3,4,5,6-tetra-
    methylphenylthio)fumaramide,
N,N,N',N'-tetraethyl-alpha-(pentamethylphenyl-
    thio)fumaramide,
N,N,N',N'-tetraisopropyl-alpha-(o-isobutylphenyl-
    thio)fumaramide,
N,N-di-n-butyl-N',N-di-n-hexyl,alpha-(o-methyl-p-n-
    hexylphenylthio)fumaramide,
N,N,N',N'-tetraethyl-alpha-(o-chlorophenyl-
    thio)fumaramide,
N,N,N',N'-tetramethyl-alpha-(p-chlorophenyl-
    thio)fumaramide,
N,N-dimethyl-N',N'-diethyl-alpha-(m-chlorophenyl-
    thio)fumaramide,
N,N,N',N'-tetraisopropyl-alpha-(3,4-dichlorophenyl-
    thio)fumaramide,
N,N-dimethyl-N',N'-diisopropyl-alpha-(3,4,5-trichloro-
    phenylthio)fumaramide,
N,N,N',N'-tetramethyl-alpha-(2,3,5,6-tetrachloro-
    phenylthio)fumaramide,
N,N-dimethyl-N',N'-diethyl-alpha-(pentachloro-
    phenylthio)fumaramide,
N,N-dimethyl-N',N'-diisobutyl-alpha-(p-bromophenyl-
    thio)fumaramide,
N,N,N',N'-tetramethyl-alpha-(o-chloro-p-fluoro-
    phenylthio)fumaramide,
N,N-dimethyl-N',N'-diethyl-alpha-(o-iodophenyl-
    thio)fumaramide,
N,N-dimethyl-N',N'-diisopropyl-alpha-(3,4-difluoro-
    phenylthio)fumaramide, etc.

Illustrative of the sulfoxides and sulfones of the invention are the identical compounds named specifically in the previous paragraph with S being replaced by SO or $SO_2$.

The arylthio maleimides, maleamides and fumaramides of the invention are made by reacting arylsulfenyl chlorides with maleimides, maleamides and fumaramides and dehydrochlorinating the reaction product. In many cases the dehydrochlorination of the reaction product will proceed immediately after the formation of the reaction product and without the need of increased temperatures or dehydrochlorination agents; however, in some cases it will be desirable to heat the reaction product and/or employ a basically reacting material such as triethylamine, sodium or potassium hydroxide, pyridine, etc., to aid the dehydrochlorination. The arylsulfinyl or arylsulfonyl maleimides, maleamides and fumaramides of the invention are prepared by the controlled oxidation of the corresponding arylthio compound of the invention using $KMnO_4$, $CrO_3$, $H_2O_2$ in glacial acetic acid, $HNO_3$ in acetic anhydride, or similar oxidizing agents.

The invention will be more clearly understood from the following detailed description of specific examples thereof:

*Example 1*

This example describes the preparation of N-methyl-3-(p-chlorophenylthio)maleimide. A mixture of 17.9 g. (0.10 mole) of p-chlorobenzenesulfenyl chloride, 11.1 g. (0.10 mole) of N-methyl maleimide and 50 ml. of glacial acetic acid was stirred over night in a flask at room temperature. By the next morning the red solution had turned light orange. The reaction mixture was stripped to remove volatiles and distilled to give 3.0 g. of yellow oil, B.P. 110–140° C./15 mm. of Hg, up to a pot temperature of 210° C. There remained 21.7 g. of a thick oil in the pot. The residue product was crystallized from 300 ml. of absolute ethanol to give 10.5 g. (42% yield) of N-methyl-3-(p-chlorophenylthio)maleimide in the form of long cottony tan needles, M.P. 135–136.5° C. A second recrystallization raised the melting point to 139.5–140.5° C. An elemental analysis of the recrystallized product was made yielding the following results:

| Percent | Found | Calc'd. for $C_{11}H_8ClNO_2S$ |
|---|---|---|
| C | 52.0 | 52.1 |
| H | 3.3 | 3.2 |
| N | 5.7 | 5.5 |
| S | 12.7 | 12.6 |
| Cl | 14.0 | 14.0 |

If in the experiment of this example instead of p-chlorobenzenesulfenyl chloride there is used an equal molar amount of pentachlorobenzenesulfenyl chloride, benzenesulfenyl chloride, a toluenesulfenyl chloride, or a xylenesulfenyl chloride the product obtained is N-methyl-3-(pentachlorophenylthio)maleimide, N-methyl-3-(phenylthio)maleimide, an N-methyl-3-(tolylthio)maleimide or an N-methyl-3-(xylylthio)maleimides, respectively.

*Example 2*

A mixture of 14.4 g. (0.1 mole) of benzenesulfenyl chloride, 17.0 g. (0.1 mole) of N,N,N',N'-tetramethyl maleamide and 50 ml. of glacial acetic acid are stirred overnight at room temperature. The next morning the reaction mixture is stripped of volatiles at water pump vacuum. The reaction mixture is then distilled under a vacuum at about 15 mm. of Hg or less up to a pot temperature of 200° C. to remove unreacted materials and promote the dehydrochlorination of the reaction product giving the desired N,N,N',N'-tetramethyl-alpha-(phenylthio)maleamide. If desired, 10.1 g. (0.1 mole) or more of triethylamine is added to the reaction prior to distillation to promote the dehydrochlorination reaction. If the triethylamine is used, after the distillation the reaction mixture is filtered to remove the triethylamine hydrochloride. The dehydrochlorinated crude reaction mixture can be further purified by crystallization, solvent extraction or other conventional methods.

If in the experiment of Example 2 instead of the benzenesulfenyl chloride there is used an equal molar amount of a toluenesulfenyl chloride, a xylenesulfenyl chloride, m-chlorobenzenesulfenyl chlorides or pentachlorobenzenesulfenyl chloride there is obtained as the product an N,N,N',N'-tetramethyl-alpha-(tolylthio)maleamide, an N,N,N',N'-tetramethyl-alpha-(xylylthio)maleamide, N,N,N',N'-tetramethyl-alpha-(m-chlorophenylthio)maleamide or N,N,N',N'-tetramethyl-alpha-(pentachlorophenylthio)maleamide, respectively.

*Example 3*

This example describes the preparation of N,N-dimethyl-N',N'-diethyl-alpha-(p-tolylthio)fumaramide. A mixture of 15.8 g. (0.1 mole) of toluenesulfenyl chloride, 19.8 g. (0.1 mole) of N,N-dimethyl-N',N'-diethylfumaramide, and 50 ml. of glacial acetic acid is stirred in a reaction vessel overnight at room temperature. The reaction mixture is then stripped of volatile material and distilled to remove unreacted material at a pressure of about 15 mm. of Hg to a pot temperature of about 200° C. If desired during distillation 10.1 g. (0.1 mole) of triethylamine is added to the reaction mixture to promote the dehydrochlorination producing the desired N,N-dimethyl-N',N'-diethyl-alpha-(p-tolylthio)fumaramide. If triethylamine is used during the distillation to promote the dehydrochlorination, the reaction mixture is filtered after the distillation to remove the amine hydrochloride. Further purification of the crude product from the distillation by crystallization, solvent extraction or other conventional methods can be carried out.

If in the experiment of Example 3 instead of p-toluenesulfenyl chloride there is used an equal molar amount of benzenesulfenyl chloride, a xylenesulfenyl chloride, o-chlorobenzenesulfenyl chloride, or pentachlorobenzenesulfenyl chloride, the product produced is N,N-dimethyl- N',N'-diethyl-alpha-(phenylthio)fumaramide, an N,N-dimethyl-N',N'-diethyl-alpha-(xylylthio)fumaramide, N,N-dimethyl - N',N' - diethyl-alpha-(o-chlorophenylthio)fumaramide, or N,N-dimethyl-N',N'-diethyl-alpha-(pentachlorophenylthio)fumaramide, respectively.

*Example 4*

This example describes the preparation of N-methyl-3-(p-chlorophenylsulfinyl)maleimide.

A sample of 20 ml. of acetic anhydride is cooled to 10° C. and 7 ml. of fuming nitric acid is added with stirring. This nitric acid solution is then added slowly with stirring and external cooling as necessary to keep the temperature of the reaction below about 15° C. to 25.3 g. (0.1 mole) of N-methyl-3-(p-chlorophenylthio)maleimide prepared in a manner similar to Example 1 and dissolved in 100 ml. of acetic anhydride. After the oxidizing agent has all been added to the reaction mixture it is allowed to stand for 3 hours at 10°–15° C., then is poured into ice water. The organic material product is recovered from the water layer and this crude product is washed with water and dried. The crude product is further purified by crystallization or by other conventional means.

If in Example 4, instead of N-methyl-3-(p-chlorophenylthio)maleimide, there is used an equal molar amount of N,N,N',N'-tetramethyl-alpha-(pentachlorophenylthio)maleamide, an N,N-dimethyl-N',N'-diethyl-alpha-(p-tolylthio)maleamide, N-methyl-3-(phenylthio)maleimide, or an N,N,N',N' - tetramethyl-alpha-(xylylthio)maleamide, the product obtained is N,N,N',N'-tetramethyl-alpha-(pentachlorophenylsulfinyl)maleamide, an N-methyl-3-(tolylsulfinyl)maleimide, N,N-dimethyl-N',N'-diethyl-alpha-(phenylsulfinyl)fumaramide or an N,N,N',N'-tetramethyl-alpha-(xylylsulfinyl)maleamide, respectively.

*Example 5*

This example describes the preparation of N-methyl-3-(p-chlorophenylsulfonyl)maleimide. To a flask is added 25.3 g. (0.1 mole) of N-methyl-3-(p-chlorophenylthio)maleimide prepared in a similar manner to that described in Example 1. Also to this reaction flask is added 100 ml. of glacial acetic acid. To the reaction flask then is added with stirring and at a sufficiently low rate to keep the temperature of the reaction mixture below about 25° C. 35 g. of 30% aqueous hydrogen peroxide. The reaction mixture is maintained at a temperature between 55 and 75° C. for two hours, then the reactants are gradually warmed to 95° over a period of 1 hour. The reaction mixture is then poured into about 750 ml. of ice water. The organic layer is separated from the water layer and the product is washed with water. This crude product which is N-methyl-3-(p-chlorophenylsulfonyl)maleimide, is further purified by recrystallization or by other conventional means.

In the experiment of Example 5, if instead of N-methyl-3-(p-chlorophenylthio)maleimide there is used an equal molar amount of N,N,N',N'-tetramethyl-alpha-(pentachlorophenylthio)fumaramide, N-methyl-3-(phenylthio)maleimide, an N,N-dimethyl-N',N'-diethyl-alpha-(tolylthio)maleimide or an N,N,N',N'-tetramethyl-alpha-(xylylthio)maleamide the resulting product is an N,N-N',N' - tetramethyl - alpha-(pentachlorophenylsulfonyl)fumaramide, N-methyl-3-(phenylsulfonyl)maleimide, an N,N-dimethyl-N',N'-diethyl - alpha - (tolylsulfonyl)maleamide or an N,N,N',N'-tetramethyl-alpha-(xylylsulfonyl)maleamide.

*Example 6*

The bacteriostatic properties of the compounds of the invention are illustrated by the testing of the product of Example 1 namely N-methyl-3-(p-chlorophenylthio)maleimide. This test compound was mixed in predetermined concentrations with hot sterile agar which was subsequently poured into Petri dishes, cooled and allowed to harden. Nutrient agar containing the test compound was then inoculated with the bacteria *Staphylococcus aureus* and *Salmonella typhosa* and the samples were incubated for two days at 37° C. The growth of the Staphylococcus bacteria was inhibited at compositions of the test compound as low as 1 part per million and the Salmonella bacteria at concentrations of the test compound as low as 100 parts per million. Thus it is seen that the compounds of the invention are potent bacteriostats. Usually these novel compounds will be applied as bacteriostats in concentrations in the range of 0.0001% to 1%, preferably 0.001% to 0.1% suspended, dispersed or dissolved in an inert carrier. Suitable compounding of the compounds of the invention is discussed in detail hereinbelow.

*Example 7*

This example illustrates the soil fungicidal activity of the compounds of the invention by the testing of the product of Example 1, namely N-methyl-3-(p-chlorophenylthio)maleimide. In this test naturally-infested soil fortified with fungi that incite root rots, stem cankers, seedling blights, and seed decay, is treated with the test chemical and incubated in a sealed container for a period of 24 hours. Seeds are sown in the treated soil which is then incubated at 70° C. for 48 hours before removing to greenhouse benches. Disease assessments are made two weeks later.

A uniform supply of infested soil containing the following organisms is prepared:

*Rhizoctonia solani*
*Fusarium oxysporum f. vasinfectum*
*Sclerotium rolfsii*
*Verticillium albo-atrum*
*Pythium ultimum*

A 6 milliliter aliquot of a 1% stock solution of a test chemical is pipeted into a Mason jar containing 600 grams of infested soil. This initial application rate is 100 p.p.m. or approximately 200 lbs. per 6-inch acre. Testing is also made at the 30 p.p.m. level. The jar is sealed and the contents are thoroughly mixed by vigorous shaking. The treated soil is incubated at 25° C. for 24 hours and is transferred to 4-inch azalea pots. Fifteen cotton and cucumber seeds are sown in each pot. The seeded pots are then incubated at 70° C. and at high relative humidity (96–98%) to secure activity of the organism in the soil. Forty-eight hours later the pots are removed to the greenhouse where disease assessments are made two weeks later.

In evaluating the tests the number of seedlings emerged and the number remaining healthy are recorded. The percent emergence and disease incidence is based on the inoculated, untreated and the sterile soil treatments. The following rate scale is used.

| Rating: | Number of healthy plants/30 |
|---|---|
| E—Excellent | 26–30 |
| P—Promising | 19–25 |
| F—Fair | 11–18 |
| N—No Good | 10 or less |

Fair fungicidal activity was demonstrated by the compound of Example 1 at both 100 and 30 parts per million concentration.

Actually the preferred compounds for soil fungicidal use are the compounds not containing chlorine, i.e., for soil fungicidal use the compounds of the general formulas where Y is methyl and $n$ is from 0 to 2 are the preferred compounds.

In commercial use these soil fungicides of the invention are applied to the soil in concentrations in the range of about 2 to about 200 lbs./acre, preferably in the range of about 5 to about 100 lbs./acre, depending on the activity of the particular compound, the nature of the soil, how badly the soil was infested with fungi, the particular types of fungi to be suppressed or destroyed, etc. The soil fungicides can be applied to the soil in dilute concentration as described above and mixed into the soil by plowing, disking, harrowing, or other type of cultivation, or at the time of seeding. Application of the chemical to the soil can be prior to or concurrently with the cultivating or seeding operations by apparatus well known and commercially available for this type of treatment. Alternatively, the soil can be treated by planting seeds treated with the chemical, but the direct soil treatment rather than the seed treatment would appear to be more effective.

The new products of the invention can be applied directly to the material to be treated. They can also be incorporated in disinfectant soaps or antiseptic creams. The present products are effective in extremely dilute concentrations and for most applications it is preferred to incorporate them in a carrier or diluent. Normally the new compounds of the invention will be applied with an inert carrier, with the inert carrier being present as the major component of the formula, i.e., in excess of 50% by weight, and the chemical of the invention and other ingredients will be present in minor amounts totalling less than 50% by weight. The choice of diluent is determined by the use of the composition as is the concentration of the active ingredient in the diluent. Thus, by admixture with an inert pulverulent carrier such as talc, bentonite, kieselguhr, diatomaceous earth, etc., there can be prepared compositions suitable for biological toxicant use. Solutions of the compounds in organic solvents such as kerosene can be applied as a spray or impregnating bath, if desired. Suitable formulations of the compounds of the invention are also prepared by mixing the compounds with an emulsifying agent suitable in the presence of organic solvents and then diluting with water to form an aqueous emulsion of the compound. Suitable emulsifying agents include, e.g., alkylbenzenesulfonates, polyalkylene glycols, salts of sulfated long-chain alcohols, sorbitan fatty acid esters, etc.; other emulsifying agents which can be used to formulate emulsions of the present compounds are listed, e.g., in U.S. Department of Agriculture Bulletin E607.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:
1. A compound selected from the class consisting of compounds of the formulas

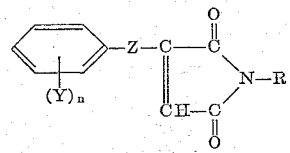

and

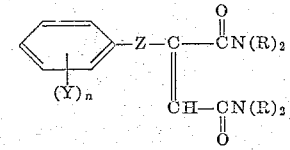

wherein Y is selected from the class consisting of halogen atoms and lower alkyl, $n$ is an integer from 0–5, Z is selected from the class consisting of S, SO and $SO_2$, and R is lower alkyl.

2. A compound of claim 1 wherein Y is Cl, $n$ is 1 and Z is S.
3. A compound of claim 1 wherein Y is $CH_3$, $n$ is 2 and Z is S.
4. N-methyl-3-(p-chlorophenylthio)maleimide.
5. N,N,N',N' - tetramethyl - alpha - (phenylthio)maleamide.
6. N,N - dimethyl - N',N' - diethyl - alpha - (p - tolylthio)fumaramide.
7. N - methyl - 3 - (p - chlorophenylsulfinyl)maleimide.
8. N - methyl - 3 - (p - chlorophenylsulfonyl)maleimide.

References Cited by the Examiner
UNITED STATES PATENTS

| | | | |
|---|---|---|---|
| 1,915,334 | 6/33 | Salzberg et al. | 260—243 |
| 2,075,359 | 3/37 | Salzberg et al. | 167—22 |
| 2,424,199 | 7/47 | Horst | 167—33 |
| 2,429,097 | 10/47 | Ladd | 167—33 |
| 2,623,882 | 12/52 | Meyer | 260—326.5 |
| 2,865,730 | 12/58 | Gates et al. | 71—2.5 |
| 2,886,594 | 5/59 | Surrey | 260—558 |

IRVING MARCUS, *Primary Examiner.*

NICHOLAS S. RIZZO, *Examiner.*